Oct. 23, 1945.  H. S. BAILEY  2,387,635
METHOD FOR THE PREPARATION OF PECTIN
Filed Feb. 24, 1945
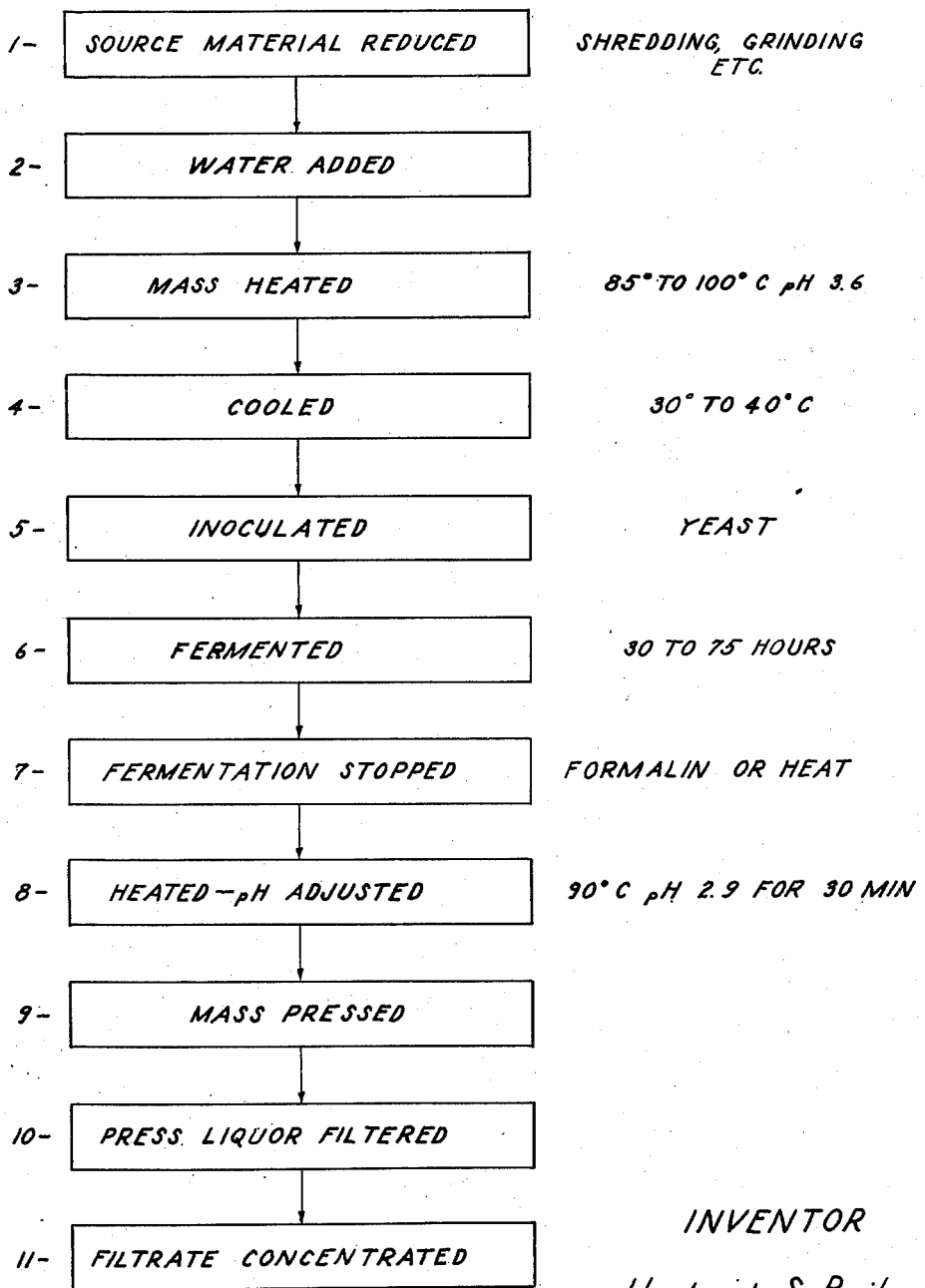
INVENTOR
Herbert S. Bailey
by  Attorney Patented Oct. 23, 1945

2,387,635

UNITED STATES PATENT OFFICE 2,387,635

METHOD FOR THE PREPARATION OF PECTIN

Herbert S. Bailey, Ontario, Calif., assignor to California Fruit Growers Exchange, Los Angeles, Calif., a corporation of California Application February 24, 1945, Serial No. 579,573

3 Claims. (Cl. 195—2)

My invention is concerned with a new process for preparing pectin-bearing vegetable material for the extraction therefrom of pectin.

A major object of my invention is to provide a method whereby certain soluble solid constituents may be removed from vegetable materials prior to the extraction from such material of its pectin content.

Another object is to disclose a method whereby pectin may be obtained from vegetable materials with increased purity and with greater ease and convenience.

A further object is to disclose a new and improved method for recovering pectin from its source materials.

Other objects and advantages of the method disclosed herein will occur to those versed in this art, if not specifically referred to by me.

The drawing is a flow sheet representing in a general manner a preferred embodiment of my invention.

My new process involves broadly the treatment of vegetable material to improve it as a source of pectin. Schemes on this general order have been heretofore conceived and patented, but none known to me operates as mine or offers all the advantages which accrue to the process I have discovered.

In order to clearly set forth my invention an example will be given by selection from my records of successful treatment of citrus fruit pulp in accordance with the principles involved.

600 liters of shredded orange peel (measured by displacement) are run into 350 liters of boiling water. This mass is mixed, heated, if necessary, and maintained at about 90° C. for about 10 minutes. This heating step will result in some slight solubilization of the pectinous material in the orange peel. However, this is not an extraction of the pectin in any commercial sense, but is simply for the purpose of sterilization, and sterilization is its only significant result. While the terms "extraction" and "extract" may have a broad significance of removing, or a thing removed, I use the terms "extraction" and "to extract" herein in the sense common in this art, namely, to convert pectin from a water-insoluble to a water-soluble form; and I use the term "an extract" to indicate an aqueous solution of pectin.

The pH during this heating is adjusted to within the range of about 2.8 to about 3.6 in order to avoid demethoxylation of the pectin. With some source materials the mass may sometimes fall within this pH range without adjustment. After a period sufficient to assure inactivation of enzymes and micro-organisms which may be present in the peel, which period will be on the order of 10 minutes, the mass is cooled and the pH is adjusted to fall within the range of about 3.5 to about 3.8, and KCl (150 to 200 grams) is added as a yeast nutrient. Adjustments of pH are conveniently accomplished by use of HCl, or ammonia, as required. The mass is cooled, preferably to about 33° C., and inoculated with a pure culture of yeast, genus Saccharomyces, which preferably has been cultured in orange juice for 24 hours. The inoculated mass is allowed to ferment for 30 to 75 hours at about 33° C.

At the completion of fermentation, which may be determined by the viscosity of a test sample of the liquor, formalin is added to inactivate the yeast. This is advisable due to the fact that the mass is difficult to heat through, and if heat alone is relied on to stop the fermentation, action may progress too far in parts of the batch. However, in most instances no harm will result if fermentation is not stopped immediately, and the use of formalin or its equivalent is not to be regarded as necessary. The pH is now adjusted to approximately 2.9, and the mass is heated to 90° C. for about 30 minutes to solubilize the pectinous components. The mass is then pressed to recover pectin liquor. The liquor is filtered and concentrated, and pectin is precipitated, if it is desired to produce a dry pectin product.

In considering further the alternative details of my process, as well as the broader aspects thereof, the following may be pointed out with respect to the various steps of the process as identified by the numerals appearing on the flow sheet:

1. My process may be applied to any of the common sources of pectin. These sources at present commercially in use are oranges, lemons, grapefruit, and apples, though others are known. It will be understood that where I refer to fermenting the pectinous vegetable source material, that material is meant which is capable of serving as a source from which a pectin extract may be prepared. The extract itself is not here included. When applied to apples which contain an appreciable amount of starch it may be desirable to employ first a method for converting the starch to fermentable sugars. In this connection the process disclosed in United States Patent No. 2,088,458 will be of interest. This process employs an enzyme preparation to hydrolyze the starch which is then removed from the apple pomace prior to pectin extraction. In conjunction with my fermentation process, however, this removal is not made, but the hydrolyzed starch is fermented.

It has been indicated that the source material is to be shredded, ground, or otherwise reduced. This reduction in the particle size in the pectous source material should be carried to a point where the individual particles may be reasonably quickly heated and cooled throughout their entirety. Peel particles which have been ground in a grinder having a face-plate containing holes with a diameter of about one-eighth of an inch will be satisfactory for my purposes. The peel particles should not be too coarse, otherwise thorough heating in the subsequent steps will not be obtained. Peel or other source material which has been shredded as being passed through a machine which cuts it into strips about one-eighth inch thick is very satisfactory for use in my process.

2. The amount of water in which the shredded or ground source material is suspended is not critical. Enough water should be used, depending upon the condition of the pulp, to give a handleable suspension and one in which the material used to adjust the pH range to the desired point will have ready access to the pulp particles. Also the pulp suspension should be fluid enough to permit thorough stirring so that later the yeast for the fermentation will be readily distributed throughout the suspension. Of course the use of hot water will reduce the amount of heating required to assure inactivation of enzymes and microorganisms which may be present in the peel.

3. The heating of the peel suspension should always be adequate to inactivate the enzymes and microorganisms which may be present. Temperatures within the range of from about 85° C. to 100° C. are satisfactory for this purpose. The time of the heat treatment will, of course, be dependent upon the condition of the peel being treated, as well as the pH of the suspension. If the pH is comparatively high, that is in the order of 3.3 to 3.6, a longer time of heating may be necessary, while if the pH of the suspension is in the neighborhood of 2.8 the heating time may be somewhat shortened. The factors of temperature, time, and pH must always be correlated in this step in order to obtain the result desired, namely the inactivation of the enzymes. It is cautioned that the success of this process will depend to a very considerable extent upon the thoroughness with which the enzymes are inactivated.

While I have in the specific example referred to the use of different acidity ranges for enzyme inactivation and for fermentation, actually this need not be true. Yeasts can be used which function well in the pH range suitable for inactivation of enzymes or they may be modified by culturing. Acidities less than those represented by pH values above about 4 are detrimental to the pectin when the pectin is heated.

4. The cooling of the pulp suspension at this step may be accomplished in any suitable manner. It is desirable that the pulp suspension be thoroughly cooled to within the range of from about 30° C. to 40° C. prior to inoculation with the yeast. It is possible to carry on the fermentation step in the upper portion of this broader range, say at about 37° C. to 40° C.; and this may be chosen as the operating range where facilities for cooling are limited. However, at these higher temperatures, heat damage to the jelly grade of the pectin occurs more readily, and thus it is more difficult to obtain successful over-all results when this higher portion of the temperature range is used for the fermentation. Under normal operating conditions and when suitable equipment is available I prefer to cool the pulp to within the lower portion of the above-mentioned range, that is, preferably; at least down to about 33° C.

5. The yeast or other organism used for the fermentation will be chosen for its ability to ferment sugars and other unwanted solids, such as gums, etc. The end products will preferably be liquids and/or gases. A number of yeasts are known to be suitable. That yeast is best which ferments the most of the unwanted elements and which will operate under wide ranges of temperature and hydrogen ion concentration without substantially damaging the pectin. The fermenting organism should work rapidly and give contaminating microorganisms little chance to interfere. I have found especially suitable various strains of true yeast, genus Saccharomyces, capable of flourishing under relatively adverse conditions. However it is desirable to adjust the conditions of temperature, hydrogen ion concentration, etc., as nearly as practical to optimum values for the yeast employed insofar as possible. Mixtures of different yeasts may be used.

While I have mentioned hereinbefore that suitable yeasts may be cultured for my process by means of orange juice it is obvious that the culture media for the yeast may be any of the known media used for culturing yeasts of the genus Saccharomyces. Furthermore, I have found it highly desirable to use a portion of the fruit or vegetable source material which is being used for the extraction of pectin as a medium for culturing the yeast to be used. Then, too, a pectin extract may be satisfactorily used. As is well known by culturing the yeast under the environmental conditions in which it is to be used the yeast will adapt itself in a very short time to growing under those conditions.

6. The time of fermentation is variable within quite wide limits. The length of time will differ with different ferments and will also be dependent upon the source material being used, as well as the pH and temperature of fermentation. Since the various pectinous source materials vary widely in their characteristics, it is impracticable to set out more exactly the conditions for the fermentation, but clearly the establishment of the precisely proper conditions for particular circumstances will fall within the skill of those working in this art.

7. At the completion of fermentation, which may be determined by the viscosity of a test sample of the liquor or by other means, a suitable yeast inactivator is added to the pulp suspension. While formalin has been mentioned hereinbefore, other inactivators such as chlorine or sulfurous acid may be used. The use of an inactivator is advisable due to the fact that the mass is difficult to heat through. If heat alone is relied on to stop the fermentation too long a time may be involved and also some detrimental effects may be noticeable in the pectin to be subsequently extracted.

The progress of the fermentation may be determined by making periodic determinations of the percentage of soluble solids in the aqueous phase. That is to say, the fermentation may be stopped when the percentage of soluble solids has decreased to a point where they will no longer be an important factor in increasing the viscosity of the pectin extract to be subsequently obtained.

8. The extraction of the pectin from the source material may be accomplished by several different ways. Ordinarily the pH is maintained in the region of about 2.9. Any of the common mineral acids may be satisfactorily used for the extraction. Hydrochloric acid, sulphuric acid, and sulphurous acid are all satisfactory. The time for the extraction and the temperature of the extraction are variables which are related to the pH of the extraction. The choice of conditions under which the extraction of the source material are all well known and within the expected skill of those concerned with the manufacture of pectin.

The subsequent steps, 9, 10, and 11, are all steps which are well known to those skilled in the preparation and manufacture of pectin and many modifications may be used in these steps but they are all applicable in my process.

In the ordinary process the pectin source material is subjected to an acidic water extraction as the first major step, though certain methods have been advanced for removal of some unwanted elements of the material prior to the extraction. As a result, a number of impurities are present in the ordinary process right through to the final product. By subjecting the source material, for example, citrus pulp, to a fermentation prior to extracting the pectin, I am able to convert these solid impurities to volatile forms, that is, to liquids and gases, such as alcohol and carbon dioxide. The gases will be driven off by the heating used in the extraction step, and the liquids will be separated from the pectin during its recovery. Thus I avoid any loss of pectin, such as occurs when, for example, a leaching process is relied on to remove soluble solids.

One of the major disadvantages of the commonly used processes for recovering pectin is the high viscosity of the pectin liquor which is recovered from the source material. If a greater amount of water is employed to reduce this viscosity, it must be later removed at substantial cost before the product is ready to market. The viscosity is due in part to the pectin but, in another and large part, is caused by soluble solids extracted with the pectin but constituting only contaminants in the liquor. Some of these contaminants may persist even to the final precipitated pectin, and more will exist as impurities if the pectin is not precipitated but merely produced as a concentrated liquid.

It will be recognized that much of the process that I have outlined is essentially the commonly used method for recovering pectin from its source materials. However, I have departed from such common processes in the important interposed step of processing the pectin source material to reduce contaminating solids before the material is treated to recover the pectin. This step results in many notable advantages.

I have found that removal or destruction of these solids is productive of many advantages. Exemplary among such advantages are the following: Reduced viscosity of the liquor allows greater recovery from the presses, easier filtration, and greater concentration in the evaporators. A reduced amount of precipitating agent is required. The final pectin is of greater purity. Furthermore, the fermentation appears to aid in the extraction, probably due to disruption of the pectin-containing structure of the vegetable material.

The process I have disclosed requires little additional equipment, if any. Fermentation can be carried on in the tanks generally used for extraction, and indeed the material will ordinarily not be moved between fermentation and extraction. It will be obvious from what has been said hereinabove that I obtain in my process a commercially useable grade or quality of pectin which has retained its property of forming a jelly under the usual commercial conditions now standard in this art. When properly conducted and controlled my process yields jellifying pectin of high quality.

This application is a continuation-in-part of my co-pending application Serial No. 392,668, filed May 9, 1941.

Having thus described my invention in such full, clear, and exact language as to enable others skilled in the art to use the same, I claim as my invention and desire to secure by Letters Patent the following:

1. A process for the recovery of pectin from pectous source material comprising the steps of adjusting the pH of the material to within a range of about pH 2.8 to pH 3.5, heating the pectous source material to about 90° C. for a time sufficient to inactivate enzymes and microorganisms which may be present therein, cooling the material to about 37° C. to 40° C., adding to said material and growing therein a yeast, thereby breaking down the non-pectous carbohydrate substances therein contained, adjusting the pH of the fermented mass to about 2.9 and heating the mass for a time and at a temperature sufficient to solubilize a major proportion of the pectous substances therein contained, pressing from the mass pectin containing liquor and recovering pectin from the liquor.

2. A process for the recovery of pectin from pectous source material comprising the steps of adjusting the pH of the material to within a range of about pH 2.8 to about pH 3.5 to inhibit demethoxylation of the pectous constituents during the subsequent heating step, heating the source material for a time and at a temperature sufficient to inactivate enzymes and microorganisms which may be present therein, cooling the material, adding to said material and growing therein a yeast, thereby breaking down the non-pectous carbohydrate substances therein contained and subsequently extracting pectin from the fermented mass.

3. A process for the recovery of pectin from pectous source material comprising the steps of heating the material for a time and a temperature sufficient to inactivate enzymes and microorganisms which may be present therein, said heating step being performed upon the material within the pH range of about 2.8 to about 3.5 to avoid demethoxylation of the pectous constituents during the heating step, cooling the material, adding to said material and growing therein a yeast, thereby breaking down the non-pectous carbohydrate substances therein contained, and subsequently extracting pectin from the fermented mass.

HERBERT S. BAILEY.